United States Patent
Kim et al.

(10) Patent No.: US 9,479,299 B2
(45) Date of Patent: Oct. 25, 2016

(54) METHOD AND APPARATUS FOR TRANSMITTING INFORMATION ABOUT A CHANNEL IN A WIRELESS COMMUNICATION SYSTEM

(71) Applicant: LG Electronics Inc., Seoul (KR)

(72) Inventors: Hyung Tae Kim, Anyang-si (KR); Han Byul Seo, Anyang-si (KR); Ki Jun Kim, Anyang-si (KR); Byoung Hoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/219,637

(22) Filed: Mar. 19, 2014

(65) Prior Publication Data

US 2014/0204874 A1 Jul. 24, 2014

Related U.S. Application Data

(63) Continuation of application No. 13/377,075, filed as application No. PCT/KR2010/003682 on Jun. 9, 2010, now Pat. No. 8,737,303.

(60) Provisional application No. 61/185,200, filed on Jun. 9, 2009, provisional application No. 61/220,209, filed on Jun. 25, 2009.

(30) Foreign Application Priority Data

Jun. 8, 2010 (KR) .................. 10-2010-0053952

(51) Int. Cl.
*H04W 4/00* (2009.01)
*H04L 5/00* (2006.01)
*H04B 7/06* (2006.01)
*H04B 7/02* (2006.01)
*H04B 7/04* (2006.01)

(52) U.S. Cl.
CPC ............ *H04L 5/0035* (2013.01); *H04B 7/063* (2013.01); *H04L 5/005* (2013.01); *H04L 5/0051* (2013.01); *H04B 7/024* (2013.01); *H04B 7/0452* (2013.01); *H04B 7/0639* (2013.01)

(58) Field of Classification Search
None
See application file for complete search history.

(56) References Cited

U.S. PATENT DOCUMENTS

| | | | |
|---|---|---|---|
| 8,737,303 B2 * | 5/2014 | Kim .................. | H04B 7/063 370/328 |
| 2008/0273624 A1 | 11/2008 | Kent et al. | |
| 2010/0027456 A1 | 2/2010 | Onggosanusi et al. | |
| 2010/0035555 A1 * | 2/2010 | Bala .................. | H04B 7/024 455/63.1 |
| 2010/0173660 A1 * | 7/2010 | Liu .................. | H04W 24/02 455/501 |

(Continued)

OTHER PUBLICATIONS

J. Kotecha et al., "LTE: MIMO Techniques in 3GPP-LTE", Freescaled Technology Forum, Nov. 5, 2008.

(Continued)

*Primary Examiner* — Anh-Vu Ly
(74) *Attorney, Agent, or Firm* — Birch, Stewart, Kolasch & Birch, LLP

(57) ABSTRACT

A method for feeding back channel information, and a user equipment (UE) therefore are discussed. The method according to one embodiment includes, if one or more cells are configured, performing a first feedback process and a second feeding process. The first feedback process is configured to transmit first channel information including rank information. The second feedback process is configured to transmit second channel information generated based on the same rank information as the rank information of the first feedback process.

16 Claims, 9 Drawing Sheets

(56) References Cited

U.S. PATENT DOCUMENTS

| | | |
|---|---|---|
| 2010/0238984 A1 | 9/2010 | Sayana et al. |
| 2010/0239036 A1* | 9/2010 | Koo et al. ............. 375/260 |
| 2010/0254335 A1 | 10/2010 | Koo et al. |
| 2010/0273514 A1 | 10/2010 | Koo et al. |
| 2010/0322176 A1* | 12/2010 | Chen et al. ............ 370/329 |
| 2011/0032839 A1* | 2/2011 | Chen et al. ............ 370/252 |
| 2011/0206106 A1* | 8/2011 | Mallik ............ H04B 7/024 375/226 |
| 2011/0269459 A1 | 11/2011 | Koo et al. |
| 2012/0218937 A1 | 8/2012 | Chen et al. |

OTHER PUBLICATIONS

J. Zhu et al., "Efficient CQI Update Scheme for Codebook Based MU-MIMO with Single CQI Feedback in E-UTRA", IEEE 19th International Symposium on Personal, Indoor and Mobile Radio Communications 2008, pp. 1-6, Sep. 2008.

* cited by examiner

METHOD AND APPARATUS FOR TRANSMITTING INFORMATION ABOUT A CHANNEL IN A WIRELESS COMMUNICATION SYSTEM

CROSS-REFERENCE TO RELATED APPLICATIONS

This application is a continuation of co-pending U.S. application Ser. No. 13/377,075, filed Dec. 8, 2011, which is a National Phase of PCT/KR2010/003682 filed on Jun. 9, 2010, and which claims priority under 35 U.S.C. 119(e) to U.S. Provisional Application No. 61/185,200 filed on Jun. 9, 2009 and 61/220,209 filed Jun. 25, 2009, and under U.S.C. 119(a) to Patent Application No. 10-2010-0053952 filed in the Republic of Korea on Jun. 8, 2010, all of these applications are hereby expressly incorporated by reference.

BACKGROUND OF THE INVENTION

1. Field of the Invention

The present invention relates to wireless communication and, more particularly, to a method and apparatus for transmitting channel information in a wireless communication system.

2. Discussion of the Related Art

A 3rd Generation Partnership Project (3GPP) Long Term Evolution (LTE) system (i.e., the improvement of a Universal Mobile Telecommunications System (UMTS)) is introduced as the 3GPP release 8. The 3GPP LTE system uses Orthogonal Frequency Division Multiple Access (OFDMA) in downlink and uses Single Carrier-Frequency Division Multiple Access (SC-FDMA) in uplink. Multiple Input Multiple Output (MIMO) having a maximum of 4 antennas is adopted. Recently, a discussion on 3GPP LTE-Advanced (LTE-A) which is the evolution of 3GPP LTE is in progress.

In the next-generation wireless communication system, in order to improve the quality of service of a user placed at the boundary of a cell, cooperative multiple point transmission and reception (CoMP) or multi-cell Multiple Input Multiple Output (MIMO) is being introduced. Adjacent cells cooperate with each other to reduce interference or increase the intensity of a signal for a user placed at the boundary of a cell.

According to paragraph 7 of 3GPP TS 36.213 V8.7.0 (2009-05) "Evolved Universal Terrestrial Radio Access (E-UTRA); Physical layer procedures (Release 8)", a mobile station feeds channel information back to a base station. The channel information includes a Precoding Matrix Indicator (PMI), a Channel Quality Indicator (CQI), a Rank Indicator (RI), etc. The RI indicates a rank calculated by a mobile station in the state where Single User-MIMO (SU-MIMO) is assumed. The rank means the number of multiplexed streams or the number of layers in the spatial domain.

If Multi-User-MIMO (MU-MIMO) or CoMP is introduced, the existing feedback method may have several problems.

First, system performance may be degraded owing to the inaccuracy of a rank. The rank is determined assuming SU-MIMO (here, the rank is called an SU-MIMO rank), but an optimum rank may be different from the SU-MIMO rank if the CoMP or the MU-MIMO is applied. For example, if a Signal-to-Interference plus Noise Ratio (SINR) is increased through the CoMP, an optimum rank may have a rank higher than the SU-MIMO rank. However, a base station may not fully obtain an optimum performance gain obtainable from the CoMP by adjusting only a Modulation and Coding Scheme (MCS) under the SU-MIMO rank.

For example, since the SINR is greatly increased in joint transmission where cooperative cells transmit data at the same time, more streams may be multiplexed by using a higher rank in order to achieve a higher data transfer rate. In general, it is preferred that a rank lower than the SU-MIMO rank be used because a plurality of user streams is multiplexed in MU-MIMO.

It is important to set an optimum feedback in the CoMP and/or MU-MIMO because a CQI and a PMI are determined according to the rank.

Second, the efficiency of radio resources used for the feedback of channel information may be degraded. A base station allocates radio resources on the basis of the highest rank for the feedback of channel information if the base station does not know the rank of a mobile station. If a rank actually used by the mobile station for feedback is small, however, resources may be wasted because only some of the allocated radio resources are used for the channel information feedback.

In the CoMP, channel information about not only a serving cell, but also adjacent cells participating in cooperation has to be fed back. Thus, if feedback overhead is increased, the amount of wasted radio resources may be further increased. If radio resources are allocated assuming a maximum feedback payload size, the amount of wasted radio resources may be increased in proportion to the number of cells participating in cooperation.

There is a need for a more efficient channel information feedback scheme in a multiple antenna system or a multiple cell cooperation system.

SUMMARY OF THE INVENTION

The present invention provides an apparatus and method for transmitting channel information in a wireless communication system.

The present invention provides an apparatus and method for transmitting channel information in a multiple antenna system.

The present invention provides an apparatus and method for transmitting channel information in a multiple cell cooperation system.

In an aspect, a method of transmitting channel information in a wireless communication system is provided. The method performed by a user equipment includes transmitting, to a base station, a recommendation rank, receiving, from the base station, an indicator rank which is determined by the base station considering the recommendation rank, and transmitting, to the base station, a channel state which is determined based on the indicator rank.

The method may further include receiving, from the base station, a dedicated reference signal (DRS) which is beamformed by the base station based on the channel state, and transmitting, to the base station, an updated channel state which is measured using the DRS.

The indicator rank may be a highest rank available for the user equipment.

The channel state may include at least one of a Precoding Matrix Indicator (PMI) for a serving cell, an effective channel for the serving cell, a PMI for a cooperative cell, an effective channel for the cooperative cell, and a Channel Quality Indicator (CQI).

The recommendation rank may periodically be transmitted.

The recommendation rank may be transmitted at a request of the base station.

The recommendation rank may be transmitted on a Physical Uplink Control Channel (PUCCH).

A PUCCH resource used to transmit the recommendation rank may be pre-defined.

A PUCCH resource used to transmit the recommendation rank may be determined based one a resource of a Physical Downlink Control Channel (PDCCH) for which the request to transmit the recommendation rank is made.

The indicator rank may be included in downlink control information transmitted on a PDCCH.

A Cyclic Redundancy Check (CRC) of the downlink control information on the PDCCH may be masked with an identifier to identify the transmission of the indicator rank.

In another aspect, a user equipment includes a Radio Frequency (RF) unit configured to transmit and receive a radio signal, and a processor coupled to the RF unit and configured to transmit, to a base station, a recommendation rank, receive, from the base station, an indicator rank which is determined by the base station considering the recommendation rank, and transmit, to the base station, a channel state which is determined based on the indicator rank.

In an MU-MIMO or CoMP environment, overall system performance can be improved because a base station can perform scheduling on the basis of more accurate channel information. Radio resources for channel information feedback can be used more efficiently.

DETAILED DESCRIPTION OF THE INVENTION

A user equipment (UE) may be fixed or mobile and also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device.

A base station (BS) commonly refers to a fixed station communicating with UEs, and it may also be called another terminology, such as an evolved NodeB (eNB), a Base Transceiver System (BTS), or an access point.

Each BS provides communication service to a specific geographical area (commonly called a cell). The cell may be classified into a plurality of areas (called sectors).

Hereinafter, downlink (DL) means communication from a BS to a UE, and uplink (UL) means communication from a UE to a BS. In downlink, a transmitter may be part of a BS, and a receiver may be part of a UE. In uplink, a transmitter may be part of a UE, and a receiver may be part of a BS.

Figure 1:
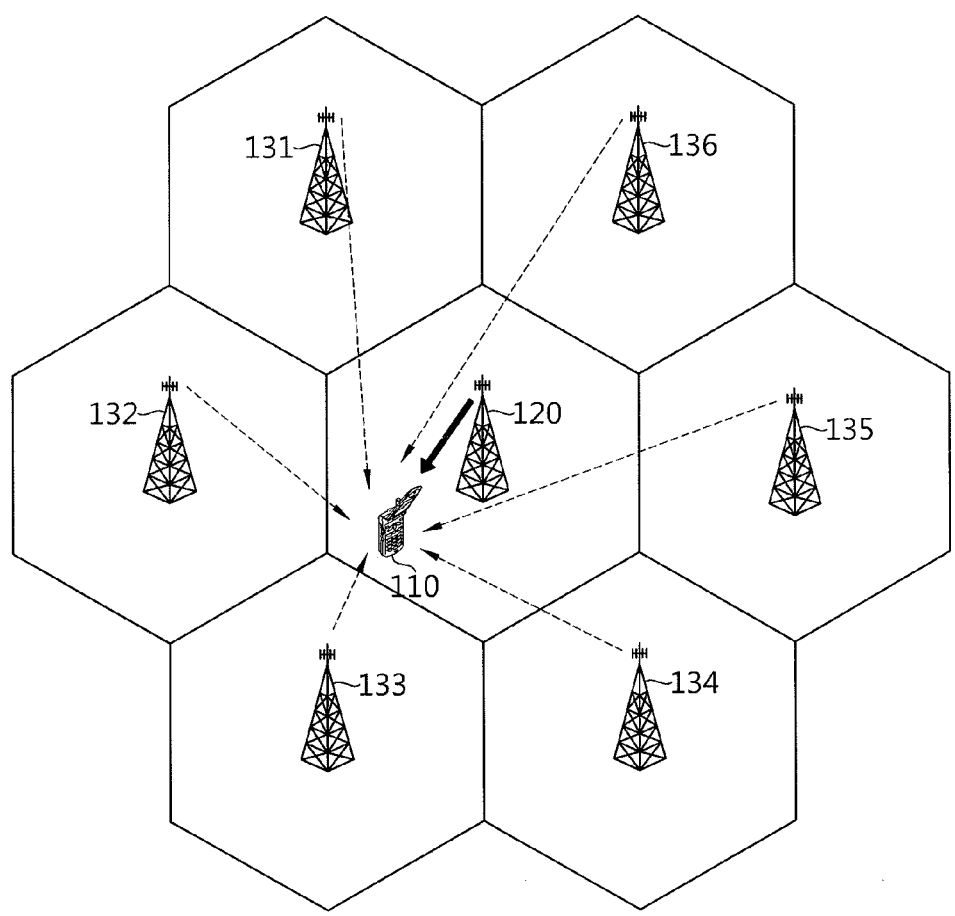
FIG. 1 shows an example of downlink communication in CoMP.

FIG. 1 shows an example of downlink communication in cooperative multiple point transmission and reception (CoMP).

A UE 100 is provided with service from a serving cell 120. Adjacent cells 131, ..., 136 adjacent to the serving cell 120 are called cooperative cells. The adjacent cells cooperate with the serving cell 120 and provide service to the UE 100.

CoMP may be classified according to the level of information that may be shared between cooperative cells. This is because a CoMP operation may be classified into several types according to whether a channel state and data to be transmitted can be shared between cooperative cells.

From among various cooperative techniques, there is a beam avoidance scheme for lowering the degree of interference incoming from cooperative cells by sharing channel information between the cooperative cells.

In the beam avoidance scheme, interference is controlled by limiting a Precoding Matrix Indicator (PMI) that may be selected by cooperative cells. A UE determines the PMI and Channel Quality Information (CQI) of a serving cell and feeds, to cooperative cells, the PMI of the cooperative cells having the least interference (this is called a Best Companion (BC) PMI) and the amount of an increase in the CQI when the cooperative cells finally use the PMI. On the other hand, a UE may feed, to cooperative cells, the PMI of the cooperative cells having the greatest interference (this is called a Worst Companion (CC) PMI) and the amount of an increase in the CQI when the cooperative cells do not finally use the PMI.

R1-091252 "Estimation of extended PMI feedback signaling required for user intra-cell and inter-cell coordination" disclosed on March, 2009 proposes a beam avoidance scheme for reducing interference with a cell for which a cooperative cell requests cooperation by feeding a PMI having small or great interference with the cooperative cell.

The conventional beam avoidance method may have the following problems.

First, according to the existing beam avoidance method, a PMI to a serving cell is first selected and a BC PMI or a WC PMI is selected, so that an optimum PMI for maximizing the SINR cannot be fed back. If the PMI of the serving cell is changed, a received beam is changed so that signal power is maximized. If the received beam is changed, the order of priority of a cooperative cell PMI affecting great interference with a receiver and the amount of interference are changed. It is necessary to jointly take the serving cell PMI and the cooperative cell PMI into consideration in order to find a PMI for maximizing the SNR because the serving cell PMI, the cooperative cell PMI, and the received beam are dependent to each other.

Second, according to the existing beam avoidance method, the selection of a PMI is limited so that a cooperative cell does not use a specific BC PMI or a specific WC PMI. This may result in a reduction in the transfer rate of the cooperative cell. This is because the cooperative cell can use only a specific reported PMI. A WC PMI method has low performance in a cooperative cell because the remaining PMIs other than a specific PMI can be used, but may require additional feedback in order to take a CQI, varying according to what PMI is used, into consideration.

In order to solve the problem, in a proposed beam avoidance scheme, the serving cell PMI and the cooperative cell PMI are determined at once in order to maximize the SINR. Furthermore, a specific PMI is not fed back to the cooperative cell, but information about space having low interference or great interference is informed. The cooperative cell may use a specific PMI which exists on the space having small interference.

Consequently, the degree of freedom where the cooperative cell can select the PMI can be secured as compared with the BC PMI method. Additional feedback regarding about what PMI is used is not required as compared with the WC PMI method.

A situation where two cells participate in a beam avoidance process is described below for convenience of description, but the present invention is not limited thereto. The present invention may be extended to a case where three or more cells participate in a beam avoidance process.

Figure 2:
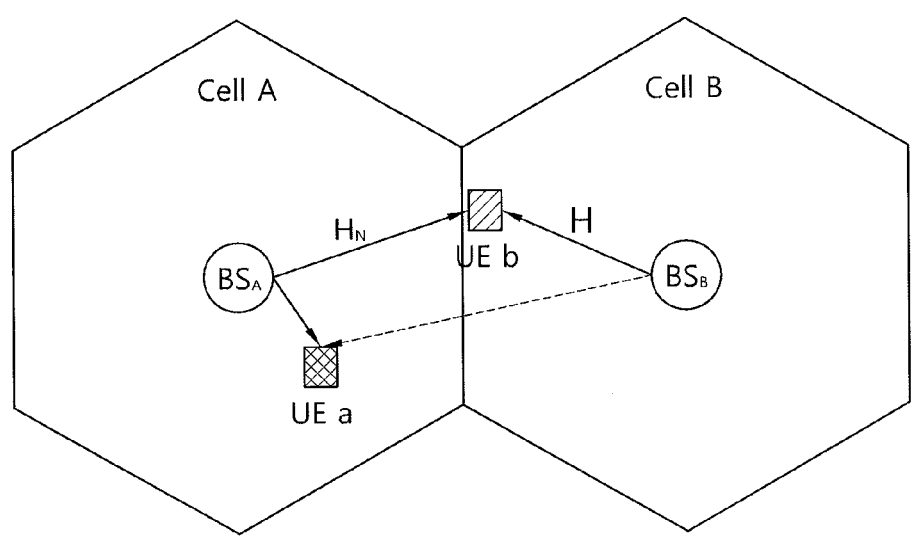
FIG. 2 shows modeling for describing proposed beam avoidance.

FIG. 2 shows modeling for describing proposed beam avoidance.

A cell B is the serving cell of a UE b. A cell A is a cooperative cell that attempts to reduce interference with an adjacent cell. It is assumed that the UE b is adjacent to the cell A and strongly subjected to interference from the cell A. A UE a is a UE using the cell A as a serving cell.

It is assumed that the BS of the cell A is a $BS_A$ and the BS of the cell B is a $BS_B$. It is assumed that a channel between the $BS_B$ and the UE b is H and a channel between the $BS_A$ and the UE a is $H_N$. It is assumed that each cell supports MIMO and the number of transmission antennas of the $BS_A$ is $Nt_A$ and the number of transmission antennas of the $BS_B$ is $Nt_B$. The number of receive antennas of the UE is Nr.

The number of transmission streams of the cell A is smaller than $Nt_A$ and the number of reception data streams of the cell B is L. The reason why the cell A does not support $Nt_A$ multiple transmissions is that, if a unitary precoder is used, beam avoidance is difficult because interference with the cell B is the same even though any precoder is used.

Furthermore, although the UE of the cell A (i.e., a cooperative cell) is one UE (i.e., SU-MIMO), the same method may be applied to a multiple user environment (i.e., MU-MIMO).

It is assumed that the UE a and the UE b interfere with each other and receive downlink data in the same time and the same frequency band.

1. Operation Based on PMI Recommendation/Limit Feedback

First, a case where, when a UE feeds a PMI, providing a good quality of service, back when it uses each BS or feeds a PMI, providing a poor quality of service, back when it uses each BS is described.

Unlike in the existing beam avoidance scheme, the UE b does not feed a rank 1 PMI, having the greatest interference or the smallest interference, back to the cell A, but feed N-dimensional space information about small interference with the UE b back. Here, $N=Nt_A-L$.

In this case, the UE b transmits data to the UE a by using the remaining N resources other than L spatial resources used by the UE b, from among $Nt_A$ spatial resources that may be ideally used by the cooperative cell. The cell A selects a precoding vector existing on the N-dimensional space (i.e., the null space of the L dimensional space used by the UE b) in order to give interference with the UE b. However, the cell A may be operated in a state where interference is reduced by properly quantizing and representing the N-dimensional space not used by the UE b by taking realistic feedback overhead into consideration.

The N-dimensional space information provided to the cooperative cell may be represented by N linearly independently vectors that spans the N-dimensional space, but may be represented by $Nt_A-N$ linearly independent vectors that spans the null space of the N-dimensional space. Hereinafter, the former is called a good space, and the latter is called a bad space. PMIs representing the spaces are defined as a rank-N Good Space Precoding Matrix Index (GSPMI) and a rank $NtA-N$ Bad Space Precoding Matrix Index (BSPMI).

If a UE requesting cooperation reports the GSPMI to a cooperative cell, the cooperative cell sets a precoding vector or a precoding matrix within the N-dimensional space that is spanned by an N vector indicated by the GSPMI. If the BSPMI is reported to the cooperative cell, the cooperative cell sets the precoding vector or the precoding matrix within the N-dimensional null space of a $(Nt_A-N)$-dimensional space that is spanned by an $Nt_A-N$ vector indicated by the BSPMI. A serving cell performs precoding by using the PMI reported by the UE as in the existing method.

The UE b feeds a PMI (i.e., a rank L) back to the serving cell B. The UE b feeds a rank-L GSPMI or rank-$(Nt_A-L)$ BSPMI back to the cooperative cell A.

A method of selecting a PMI that the UE b informs the cell B of the PMI and a BSPMI that the UE b informs the cell A of the BSPMI is described below.

1-1. Feed BSPMI Back to the Cooperative Cell

The UE b determines PMI i* and BSPMI j* of the serving cell at once as in the following equation.

$$(i^*, j^*) = \arg\max_{i \in S_{B,L}, j \in S_{A,L}} \{f(SINR_1(i,j), SINR_2(i,j), \ldots, SINR_L(i,j))\} \quad [\text{Equation 1}]$$

Here, $S_{B,L}$ is a set of rank-L PMIs used by the serving base station B, and $S_{A,L}$ is a set of rank-L PMIs used by the cooperative base station A. In this equation, a value that maximizes an objective function f( ) is calculated by taking all combinations within the PMI set $S_{B,L}$ and the BSPMI set $S_{A,L}$ into consideration The objective function f( ) may be set as any one of the following equations 2 to 4.

$$f(SINR_1(i,j), SINR_2(i,j), \ldots, SINR_L(i,j)) = \sum_{l=1}^{L} \log(1 + SINR_l(i,j)) \quad [\text{Equation 2}]$$

$$f(SINR_1(i,j), SINR_2(i,j), \ldots, SINR_L(i,j)) = \prod_{l=1}^{L} SINR_l(i,j) \quad [\text{Equation 3}]$$

$$f(SINR_1(i,j), SINR_2(i,j), \ldots, SINR_L(i,j)) = \min\{SINR_1(i,j), SINR_2(i,j), \ldots, SINR_L(i,j)\} \quad [\text{Equation 4}]$$

The SINR of an *l*-th data stream is calculated as follows.

$$SINR_l(i,j) = \frac{|U_{i,j}(l)HV_i(l)|^2 \frac{P}{L}}{N_0 + \sum_{k \neq l}^{L} |U_{i,j}(l)HV_i(k)|^2 \frac{P}{L} + \|U_{i,j}(l)H_NY_j\|^2 \frac{P_N}{N_{t_A}-L}} \quad [\text{Equation 5}]$$

Here, P and $P_N$ are signal powers received from the base station B and the base station A, respectively, and $N_0$ is the power of interference and noise from cells other than a cooperative cell. $V_i(l)$ is a precoding vector that is used by the serving base station B for the $l^{th}$ data stream and is the $l^{th}$ column vector of a precoding matrix $V_i$ corresponding to a PMI. $Y_j$ is a precoding matrix when the cooperative base station A is assumed to be used and is a rank-$(Nt_A-L)$ precoding matrix orthogonal to $W^B_k$ which a candidate of a BSPMI that will be reported by the UE. $Y_j$ consists of $Nt_A-L$ basis vectors which indicate the null space of the space that is spanned by the column vectors of $W^B_k$.

When there is a plurality of codewords consisting of the basis of the null space within a precoding codebook, a specific selected codeword may be assumed to be $Y_j$. If there is no codeword satisfying the condition, a specific basis vector representing the null space may form $Y_j$.

Here, it has been assumed that the UE b has used all the $Nt_A-L$ spatial resources other than the L spatial resources used by the UE b, from among maximum Nt spatial resources because the UE b did not know the transmission rank of the base station A.

$U_{i,j}(l)$ is a reception beamforming vector for the $l^{th}$ received data stream and is the $l^{th}$ row vector of the reception beamforming the matrix $U_{i,j}$.

$U_{i,j}$ may be determined as follow when Minimum Mean Square Error (MMSE) reception beamforming is assumed in the UE.

$$U_{i,j} = \qquad \text{[Equation 6]}$$
$$(HV_i)^H \left\{ HV_i(HV_i)^H \frac{P}{L} + H_N Y_j (H_N Y_j)^H \frac{P_N}{(Nt-L)} + N_0 I_{Nr} \right\}^{-1}$$

Here, $(A)^H$ indicates a Hermitian matrix/vector of the matrix/vector A. The precoders of the serving base station B and the cooperative base station A are assumed to be $V_i$ and $Y_j$, respectively.

The UE finds $V_{i*}$ and $W^B_{j*}$ in Equation 1 and reports the indices thereof to the BS. $V_{i*}$ is the recommendation of PMIs to be used in the serving base station B, and $W^B_{j*}$ corresponds to BSPMIs for the cooperative base station A. The UE may report a CQI that may be obtained when the cells A and B are operated on the basis of $V_{i*}$ and $W^B_{j*}$.

Additionally, in Equation 1, a computational load can be reduced by limiting the search space of i. In Equation 1, i is searched for as in the following equation and then fixed, and the entire BSPMI set is searched for in relation to j.

$$i = \arg \max_{k \in S_{B,L}} tr(|U_{SVD} H V_k|) \qquad \text{[Equation 7]}$$

Here, the $l^{th}$ row vector of $U_{SVD}$ is the Hermitian of an $l^{th}$ left dominant singular vector that may be obtained by performing Singular Value Decomposition (SVD) for H. tr(A) means the sum of diagonal elements of a matrix A or the elements of a vector A. |A| is a matrix/vector consisting of the element wise absolute value of the matrix/vector A. $V_k$ is a $k^{th}$ precoding matrix which exists within the precoding matrix set of the serving cell.

Likewise, in relation to j, a computation load can be reduced by limiting the search space. In Equation 1, j is searched for as in the following equation and then fixed, and the entire PMI set is searched for in relation to i.

$$j = \arg \max_{k \in S_{A,L}} tr(|U_{SVD} H_N W^B_k|) \qquad \text{[Equation 8]}$$

Here, $W^B_k$ is a $k^{th}$ precoding matrix which exists within a Bad Space Precoding Matrix (BSMP) set.

Alternatively, i*, j* may be found by using Equation 7 and Equation 8, respectively.

j can be found as in the following equation in relation to a given PMI i.

$$j = \arg \max_{k \in S_{A,L}} tr(|(HV_i)^H H_N W^B_k|) \qquad \text{[Equation 9]}$$

In this case, when searching for i in Equation 1, a PMI and a BSPMI may be found by determining j dependent on i by using Equation 9.

Alternatively, i*, j* may be found by using Equation 7 and Equation 9, respectively.

1-2. Feed GSPMI Back to Cooperative Cell

The UE b may determine the serving cell PMI i* and GSPMI j* like in the method of reporting the BSPMI.

The PMI i* and the GSPMI j* are determined at once as in Equation 1. The UE b finds a value that maximizes the objective function f( ) by taking all combinations within a GSPMI set $S_{A,N}$ and a PMI set $S_{B,L}$ into consideration, instead of the BSPMI set. $S_{A,N}$ is a set of rank-N PMIs used by the cooperative base station A.

When reporting the BSPMI, the UE assumed that the cooperative cell performed precoding by using the basis vectors of the null space of the BSPMI. When reporting the GSPMI j, the UE assumed that the cooperative cell performed precoding by using the space that is spanned by a Good Space Precoding Matrix (GSPM) $W^G_{j*}$.

Accordingly, SINR calculation for Equation 1 becomes the following equation.

$$SINR_l(i,j) = \frac{|U_{i,j}(l) H V_i(l)|^2 \frac{P}{L}}{N_0 + \sum_{k \neq l}^{L} |U_{i,j}(l) H V_i(k)|^2 \frac{P}{L} + \|U_{i,j}(l) H_N W^G_j\|^2 \frac{P_N}{N_{t_A}-L}} \qquad \text{[Equation 10]}$$

Here, the reception beamforming matrix $U_{i,j}$ is identically calculated after replacing $Y_j$ with $W^G_j$ in Equation 6

The UE finds $V_{i*}$ and $W^G_{j*}$ corresponding to the result of Equation 1 and reports indices thereof to the BS. $V_{i*}$ is the recommendation of a PMI used in the serving base station B, and $W^G_{j*}$ corresponds to a GSPMI for the cooperative base station A. In addition, the UE may report a CQI that may be obtained when the cell A and the cell B are operated on the basis of $V_{i*}$ and $W^G_{j*}$.

A computation load can be reduced by limiting the search spaces of i, j. i may be limited as in Equation 7.

j may be limited as in the following equation.

$$j = \arg\min_{k \in S_{A,N}} \sum_n^L \sum_m^{Nt_A-L} |U_{SVD} H_N W^G_k|_{n,m} \qquad \text{[Equation 11]}$$

Here, $|A|_{n,m}$ is an absolute value of an element which corresponds to an n row, m column of the matrix A, and $W^G_k$ is a $k^{th}$ precoding matrix existing the GSPM set. The GSPM set and the BSPM set may be the same set.

Alternatively, j may be found as follows in relation to a given PMI i.

$$j = \arg\min_{k \in S_{A,N}} \sum_n^L \sum_m^{Nt_A-L} |(HV_i)^H H_N W^G_k|_{n,m} \qquad \text{[Equation 12]}$$

2. Effective Channel Feedback

A method of the UE feeding effective channels UH and $UH_N$ after the reception beamforming back in relation to each BS is described below. Here, the UE selects one of the codewords of an effective channel feedback codebook not the PMI of the cooperative cell and feeds a selected index back.

The serving BS that has received the effective channel UH may perform Maximum Ratio Combining Beamforming (MRCBF) in order to maximize the reception signal power of the UE b. The cooperative BS that has received the effective channel $UH_N$ may perform Zero-Forcing Beamforming (ZFBF) in order to reduce interference with the UE b and perform precoding existing on the null space of $UH_N$.

Basically, the UE b may feed the indices i, j of codewords having the highest correlations with UH, $UH_N$. The BSs perform MRCBF and ZFBF for the codewords including the quantization errors of UH, $UH_N$, so that error exists in the transmission precoders. Here, the UE b may improve the SINR by performing reception MMSE beamforming because it knows a beamforming matrix used by the serving base station B and the null space used by the base station A for beamforming. By noticing this point, it is assumed that the cooperative BS first determines U and performs precoding using the null space basis of the codeword j for all the codeword combinations i, j within a codebook in reverse order not by quantizing and feeding the effective channel as a codebook (i.e., in relation to all candidates that may be represented by a quantized effective channel) and the serving BS performs precoding using the codeword i. Next, a codeword pair i*, j* having the greatest SINR is fed as an effective channel by performing reception MMSE beamforming.

The UE b determines the codeword index i* of the effective channel of the serving cell and the codeword index j* of the effective channel of the cooperative cell at once as in the following equations.

$$(i^*, j^*) = \arg \max_{i \in S_{L,NtB}, j \in S_{L,NtA}} \{f(SINR_1(i,j), SINR_2(i,j), \ldots, SINR_L(i,j))\} \quad \text{[Equation 13]}$$

Here, $S_{L,NtB}$ is the index set of $Nt_B \times L$ codewords, and $S_{L,NtA}$ is the index set of $Nt_A \times L$ codewords. Here, a value to maximize the objective function f( ) is found by taking all the combinations of the codeword i within a codebook, consisting of $Nt_B \times L$ matrices, and the codeword j within a codebook consisting of $Nt_A \times L$ matrices.

The objective function f( ) may be set as any one of the following equations 14 to 16.

$$f(SINR_1(i,j), SINR_2(i,j), \ldots, SINR_L(i,j)) = \sum_{l=1}^{L} \log(1 + SINR_l(i,j)) \quad \text{[Equation 14]}$$

$$f(SINR_1(i,j), SINR_2(i,j), \ldots, SINR_L(i,j)) = \prod_{l=1}^{L} SINR_l(i,j) \quad \text{[Equation 15]}$$

$$f(SINR_1(i,j), SINR_2(i,j), \ldots, SINR_L(i,j)) = \min\{SINR_1(i,j), SINR_2(i,j), \ldots, SINR_L(i,j)\} \quad \text{[Equation 16]}$$

The SINR of an l-th data stream is calculated as follows.

$$SINR_l(i,j) = \frac{|U_{i,j}(l)HV_i(l)|^2 \frac{P}{L}}{N_0 + \sum_{k \neq l}^{L} |U_{i,j}(l)HV_i(k)|^2 \frac{P}{L} + \|U_{i,j}(l)H_N Y_j\|^2 \frac{P_N}{N_{t_A} - L}} \quad \text{[Equation 17]}$$

Here, P and $P_N$ are reception signal powers received from the base station B the base station A, respectively, and $N_0$ is power of interference and noise from cells other than the cooperative cell. $V_i(l)$ is a precoding vector used by the serving base station B for the $l^{th}$ data stream and is the $l^{th}$ column vector of the codeword $V_i$. $Y_j$ is a precoding matrix assumed to be used by the cooperative base station A and is a rank-$(Nt_A - L)$ precoding matrix orthogonal to the codeword $W_j$. $Y_j$ consists of $Nt_A - L$ basis vectors indicating the null space of the space that is spanned by the column vectors of $W_j$.

Here, it was assumed that the UE b used all the $Nt_A - L$ spatial resources other than the L spatial resources used by the UE b, from among maximum Nt spatial resources, because the UE b did not know a transmission rank of the base station A.

$U_{i,j}(l)$ is a reception beamforming vector for the $l^{th}$ received data streams and is the $l^{th}$ row vector of the reception beamforming matrix $U_{i,j}$.

$U_{i,j}$ may be determined as follows if Minimum Mean Square Error (MMSE) reception beamforming is assumed in the UE.

$$U_{i,j} = (HV_i)^H \left\{ HV_i(HV_i)^H \frac{P}{L} + H_N Y_j (H_N Y_j)^H \frac{P_N}{(Nt - L)} + N_0 I_{Nr} \right\}^{-1} \quad \text{[Equation 18]}$$

Here, $(A)^H$ indicates the Hermitian matrix/vector of the matrix/vector A. The precoders of the serving base station B and the cooperative base station A are assumed to be $V_i$ and $Y_j$, respectively.

The UE finds $V_{i*}$ and $W_{j*}$ in Equation 13 and reports indices thereof to the BS. $V_{i*}$ is the quantized vector/matrix of UH that will be reported by the serving base station B, and $W_{j*}$ is the quantized vector/matrix of $UH_N$ that is reported to the cooperative base station A. In addition, the UE may report a CQI that may be obtained when the cell A and the cell B are operated on the basis of $V_{j*}$ and $W_{j*}$.

Additionally, in Equation 13, a computation load can be reduced by limiting the search space of i. In Equation 13, i is searched for as in the following equation and the fixed, and the entire BSPMI set is searched for in relation to j.

$$i = \arg \max_{k \in S_{L,NtB}} tr(|U_{SVD} HV_k|) \quad \text{[Equation 19]}$$

Here, the $l^{th}$ row vector of $U_{SVD}$ is the Hermitian of an $l^{th}$ left dominant singular vector that may be obtained by performing Singular Value Decomposition (SVD) for H. tr(A) means the sum of the diagonal elements of the matrix A or the elements of the vector A. |A| is a matrix/vector consisting of an element wise absolute value of the matrix/vector A.

Likewise, in relation to j, a computation load can be reduced by limiting the search space. In Equation 13, j is searched for as in the following equation and the fixed, and the entire PMI set is searched for in relation to i.

$$j = \arg\max_{k \in S_{L,NtA}} tr(|U_{SVD} H_N W_k|) \qquad \text{[Equation 20]}$$

Alternatively, i*, j* may be found by using Equation 19 and Equation 20.

In relation to a given PMI i, j can be found as in the following equations.

$$j = \arg\max_{k \in S_{L,NtA}} tr(|(HV_i)^H H_N W_k|) \qquad \text{[Equation 21]}$$

In this case, when i is fully searched for in Equation 13, i*, j may be found by determining j dependent on i using Equation 21.

Alternatively, i*, j* may be found by using Equation 19 and Equation 21, respectively.

3. Rank Feedback

Figure 3:
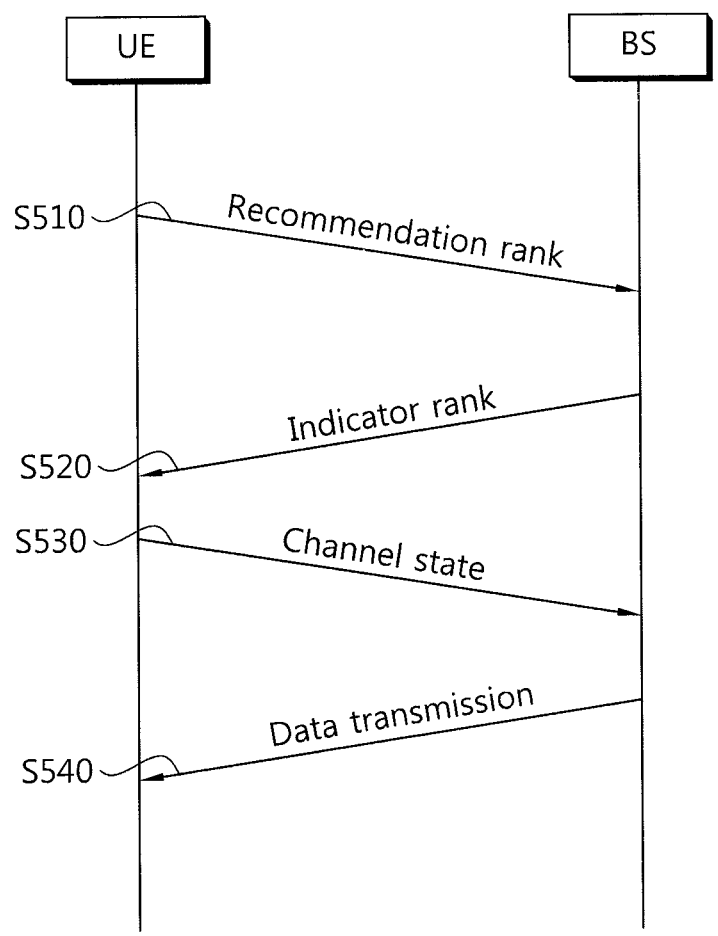
FIG. 3 is a flowchart illustrating a method of transmitting channel information according to an embodiment of the present invention.

FIG. 3 is a flowchart illustrating a method of transmitting channel information according to an embodiment of the present invention.

First, a UE determines a recommendation rank for receiving downlink service in the state where there is no scheduling information about a BS and reports the determined recommendation rank (S510). For example, the UE may determine the recommendation rank on the assumption that SU-MIMO downlink service is received. A criterion for determining the recommendation rank may be a channel quality, such as the SINR, and a correlation of channels for a plurality of antennas. In theory, single rank transmission is optimal in a low SINR, and a recommendation rank having a value close to the highest rank may be selected according to a higher SINR. Furthermore, if the distance between antennas is short or scattering between a BS and a UE is small, a higher rank may not be supported because a channel correlation is great.

A BS which has received the recommendation ranks from a plurality of the UEs determines the indicator rank of each UE by taking multi-user scheduling into consideration and sends the determined indicator rank to each UE (S520). The BS may determine the indicator rank on the basis of a recommendation rank at the time of MU-MIMO or CoMP transmission.

In MU-MIMO, several UEs divide the transmission power and radio resources of a BS and have the divided transmission power and radio resources. A rank is commonly determined to be lower than or equal to a recommendation rank determined from a viewpoint of SU-MIMO. For example, if many UEs that try to be served exist within a cell, overhead due to channel state feedback can be reduced by controlling the ranks of all the users as 1 while maintaining a high cell throughput.

In CoMP, a rank higher than a recommendation rank may be determined as an indicator rank because the SINR for a UE may be raised.

The UE feeds a channel state back on the basis of the indicator rank S530). The channel state may include at least one of a PMI for a serving cell, an effective channel for the serving cell, a GSPMI for a cooperative cell, a BSPMI for the cooperative cell, and an effective channel and a CQI for the cooperative cell.

The BS performs scheduling on the basis of the channel state information received from a plurality of the UEs and then transmits data to the UE (S540).

The UE may periodically transmit the recommendation rank or may transmit the recommendation rank at the request of the BS.

The transmission cycle of the recommendation rank may be a relatively long cycle having a unit of several hundreds or several thousands of milliseconds. The UE reports a measurement message including Reference Signal Received Power (RSRP) and/or Reference Signal Received Quality (RSRQ) for handover in a relatively long cycle. The recommendation rank may be included in the measurement message.

In the long transmission cycle, large scale fading, such as shadowing or path loss, is incorporated, but small scale fading may not be incorporated when the rank is determined. Accordingly, the recommendation rank may be reported at the request of the BS or in a short cycle having a unit of several milliseconds.

The channel state, together with the recommendation rank, may be reported. The BS may take the recommendation rank and the channel state into consideration when determining the indicator rank.

The BS may determine the indicator rank as a maximum value of a rank that may be assumed when the UE calculates the channel state. The BS determines the highest available rank of each UE as the indicator rank on the basis of the recommendation rank of each UE. The UE feeds an optimum rank and the channel state back under a restriction of the highest rank. If a channel between the BS and the UE instantly falls into deep fading, the UE may dynamically reduce the rank.

Figure 4:
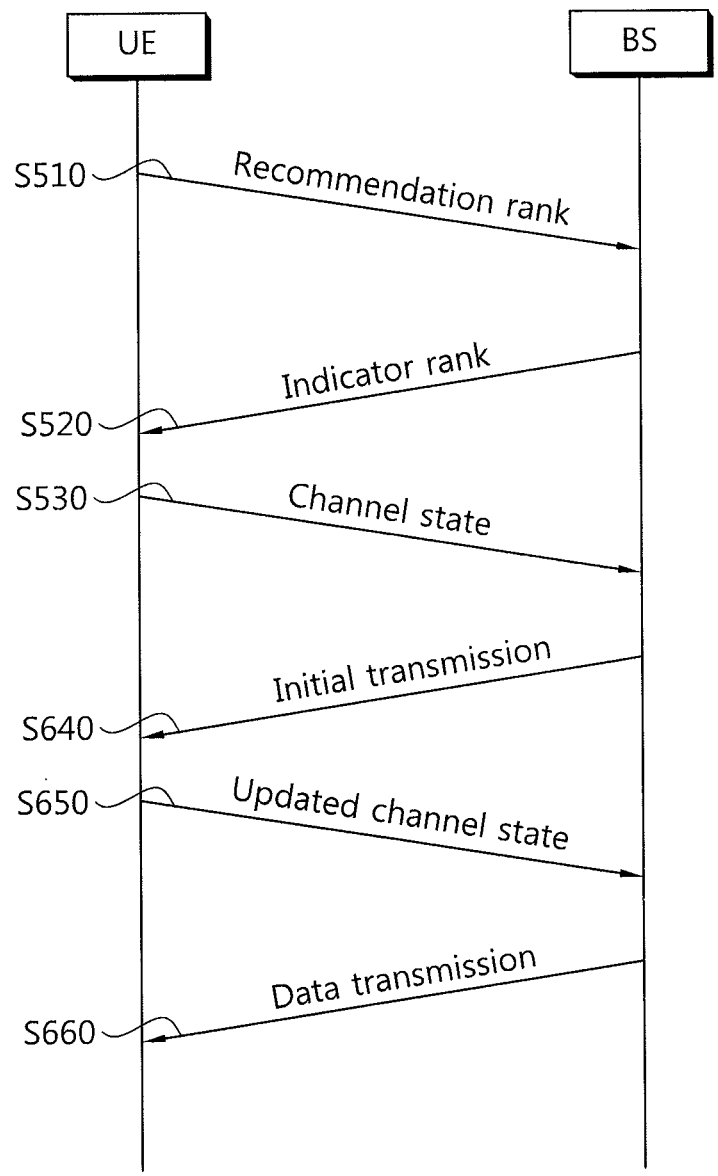
FIG. 4 is a flowchart illustrating a method of transmitting channel information according to another embodiment of the present invention.

FIG. 4 is a flowchart illustrating a method of transmitting channel information according to another embodiment of the present invention.

As compared with the embodiment of FIG. 3, after receiving a channel state from a UE, a BS performs initial transmission (S640). The channel state information fed back by the UE is a value calculated before scheduling is completed. Accordingly, initial transmission is performed in order to determine a more accurate Modulation and Coding Scheme (MCS). In the initial transmission, a Dedicated Reference Signal (DRS) to which transmission beamforming has been applied on the basis of the channel state at step S530 is transmitted.

The UE measures the channel state on the basis of the DRS and feeds an updated channel state back to the BS (S650). The BS transmits data on the basis of the updated channel state (S660).

If a cooperative cell can perform all three types of CoMP methods, including beam avoidance, joint transmission, and CoMP not supported, the UE may report all the recommendation ranks of the respective CoMP methods. A serving cell may determine a final CoMP method through negotiation with the cooperative cell and informs the UE of an indicator rank corresponding to the determined CoMP method.

If the BS informs the UE of the determined CoMP method along with the indicator rank, the UE may feed only a channel state necessary for the relevant CoMP method back.

If the BS does not inform the UE of the determined CoMP method, the UE may feed information, corresponding to the set of channel states required by the respective CoMP methods, back. This is because the effective channel, a PMI, a GSPMI, and a BSPMI in the channel state information, may be set for the CoMP method in common. If beam avoidance is performed, all the effective channels or PMIs of the serving cell and the cooperative cell are used. If joint transmission is performed, phase rotation information for coherent combining is further used. If the CoMP is not performed, only the effective channel or PMI of the serving cell is used.

A method of transmitting the recommendation rank and the indicator rank is described below.

The recommendation rank and the indicator rank may be transmitted through a Radio Resource Control (RRC) message. Alternatively, the recommendation rank and the indicator rank may be transmitted on a physical channel.

As disclosed in 3GPP TS 36.211 V8.7.0 (2009-05), physical channels in LTE may be divided into a Physical Downlink Shared Channel (PDSCH) and a Physical Uplink Shared Channel (PUSCH) which are data channel and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH) which are control channels.

Figure 5:
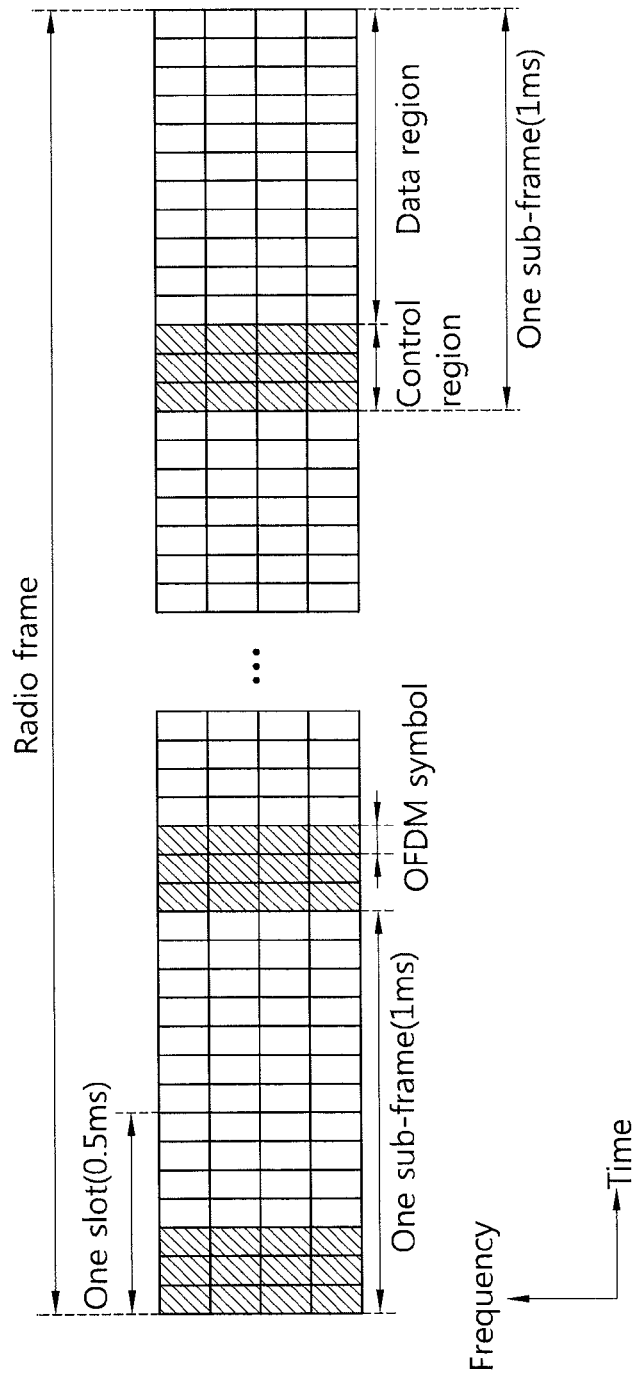
FIG. 5 shows the structure of a downlink radio frame in 3GPP LTE.

FIG. 5 shows the structure of a downlink radio frame in 3GPP LTE. For the structure, reference can be made to paragraph 6 of 3GPP TS 36.211 V8.7.0 (2009-05).

The radio frame consists of 10 subframes given indices 0 to 9, and one subframe consists of 2 slots.

One slot may include a plurality of Orthogonal Frequency Division Multiplexing (OFDM) symbols in the time domain. The OFDM symbol is only for representing one symbol period in the time domain because 3GPP LTE uses Orthogonal Frequency Division Multiple Access (OFDMA) in downlink, but a multi-access method or a name is not limited. For example, the OFDM symbol may be called another name, such as a Single Carrier-Frequency Division Multiple Access (SC-FDMA) symbol or a symbol period.

One slot is illustrated to include 7 OFDM symbols, but the number of OFDM symbols included in one slot may be changed according to the length of a Cyclic Prefix (CP). According to 3GPP TS 36.211 V8.5.0 (2008-12), in a normal CP, 1 subframe includes 7 OFDM symbols. In an extended CP, 1 subframe includes 6 OFDM symbols.

A resource block (RB) is a unit of resource allocation, and it includes a plurality of subcarriers in one slot. For example, if one slot includes 7 OFDM symbols in the time domain and the resource block includes 12 subcarriers in the frequency domain, one resource block may include 7×12 Resource Elements (REs).

The subframe is divided into a control region and a data region in the time domain. The control region includes a maximum of 4 OFDM symbols of a first slot within the subframe, but the number of OFDM symbols included in the control region may be changed. A PDCCH is allocated to the control region, and a PDSCH is allocated to the data region.

Control information transmitted through the PDCCH is called Downlink Control Information (DCI). The DCI may include resource allocation (also called a downlink grant) of a PDSCH, resource allocation (also called an uplink grant) of a PUSCH, and the activation of a set of transmission power control commands and/or a Voice over Internet Protocol (VoIP) for individual UEs within a UE group.

The DCI on the PDCCH is received through blind decoding. A plurality of candidate PDCCHs may be transmitted within the control region of one subframe. A UE monitors a plurality of candidate PDCCHs for every subframe. Here, monitoring means that the UE attempts to decode each of the PDCCHs according to a monitored PDCCH format. The UE finds its PDCCH by monitoring a set of the PDCCH candidates within a subframe. For example, if Cyclic Redundancy Check (CRC) error is not detected by demasking the identifier (i.e. a Cell-Radio Network Temporary Identifier (C-RNTI)) of the UE in the relevant PDCCH, the UE detects a PDCCH having its DCI as the PDCCH.

In order to receive downlink data, a UE first receives downlink resource allocation on a PDCCH. If the detection of the PDCCH is successful, the UE reads a DCI on the PDCCH. The UE receives the downlink data on a PDSCH by using the downlink resource allocation within the DCI. Furthermore, in order to transmit uplink data, a UE first receives uplink resource allocation on a PDCCH. If the detection of the PDCCH is successful, the UE reads a DCI on the PDCCH. The UE transmits the uplink data on a PUSCH by using the uplink resource allocation within the DCI.

Figure 6:
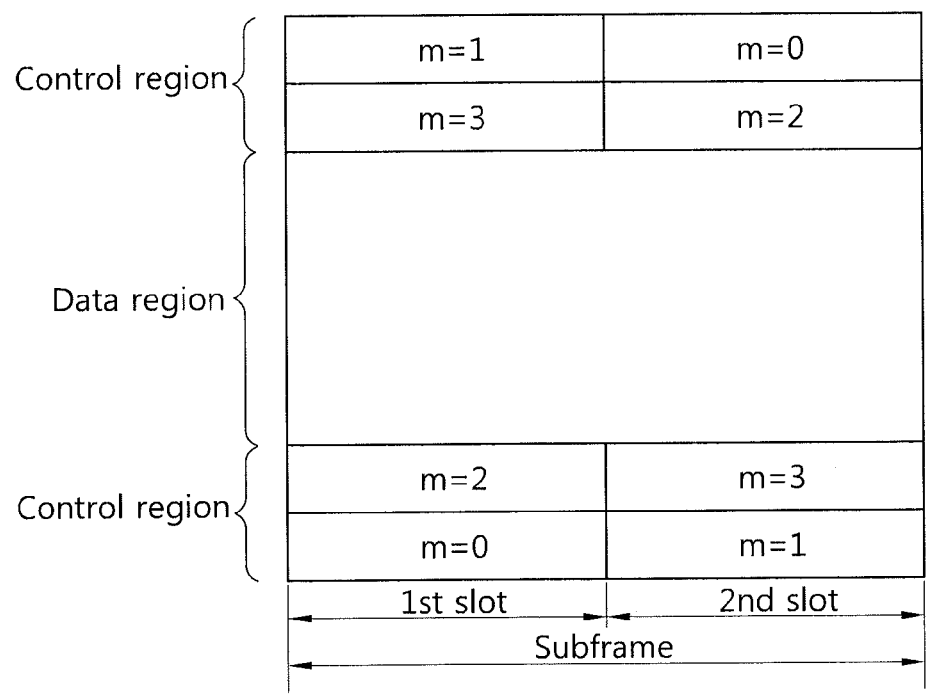
FIG. 6 shows an example of an uplink subframe in 3GPP LTE.

FIG. 6 shows an example of an uplink subframe in 3GPP LTE.

The uplink subframe may be divided into a control region to which a Physical Uplink Control Channel (PUCCH) carrying control information is allocated and a data region to which a Physical Uplink Shared Channel (PUSCH) carrying uplink data is allocated. The PUCCH for one UE is allocated in the form of a resource block pair in a subframe. Resource blocks belonging to the resource block pair occupy different subcarriers in a first slot and a second slot. m is a position index indicating the logical frequency domain position of the resource block pair which has been allocated to the PUCCH within the subframe. FIG. 6 shows that resource blocks having the same m value occupy different subcarriers in two slots.

According to 3GPP TS 36.211 V8.7.0 (2009-05), the PUCCH may use multiple formats. A PUCCH having a different number of bits per subframe according to a modulation scheme dependent on the PUCCH format may be used. The following table shows examples of modulation schemes and the number of bits per subframe according to PUCCH formats.

TABLE 1

| PUCCH Format | Modulation Scheme | Number of Bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used to transmit a Scheduling Request (SR), the PUCCH formats 1a/1b are used to transmit an ACK/NACK signal for HARQ, the PUCCH format 2 is used to transmit a CQI, and the PUCCH formats 2a/2b are used to simultaneously transmit a CQI and an ACK/NACK signal.

Figure 7:
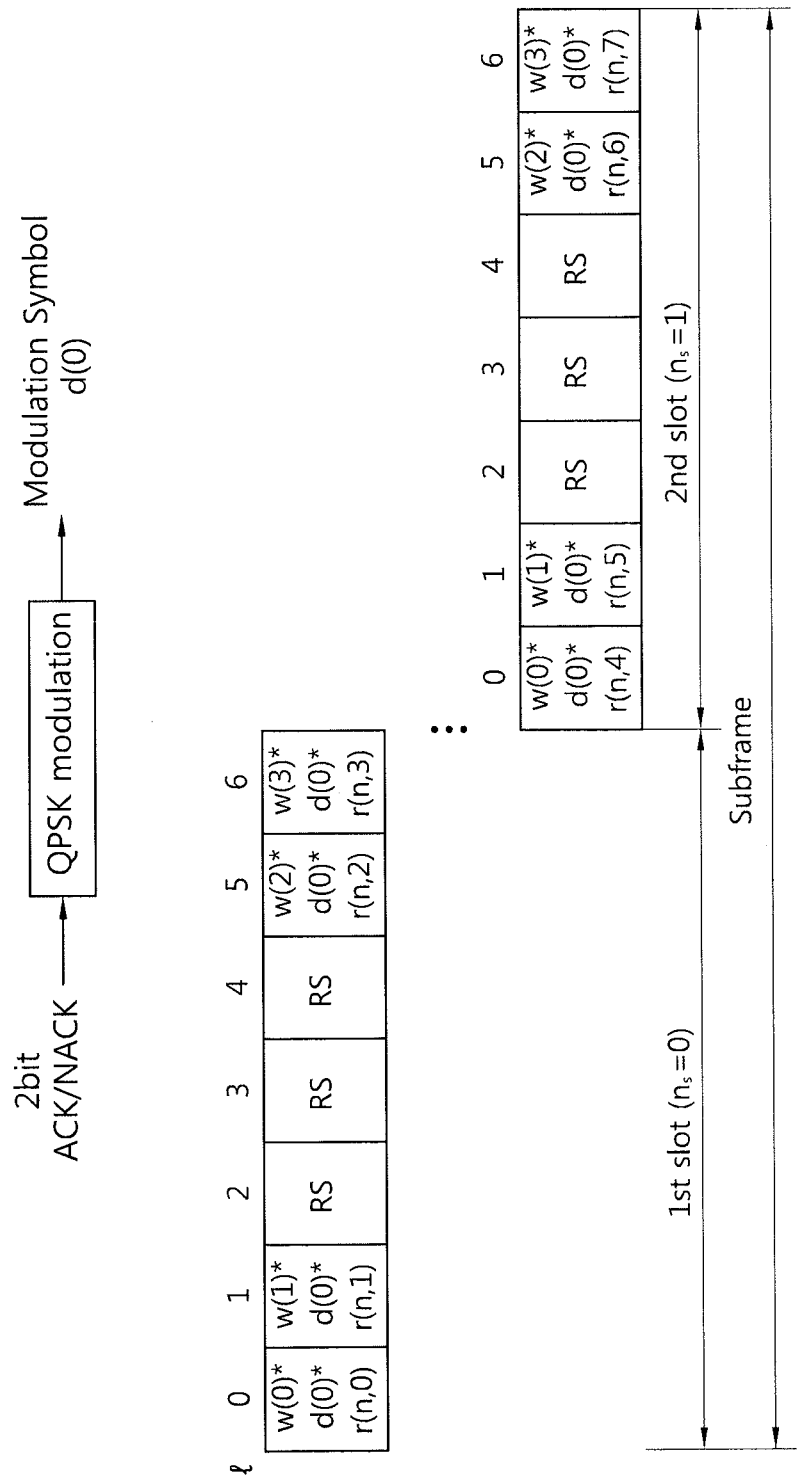
FIG. 7 shows a PUCCH format 1b in a normal CP in 3GPP LTE.

FIG. 7 shows the PUCCH format 1b in the normal CP in 3GPP LTE. The normal CP and the extended CP have the different positions and numbers of Reference Signals (RSs) because they have the different numbers of OFDM symbols included per slot, but have the same structure of ACK/NACK transmission.

A modulation symbol d(0) is generated by modulating a 1-bit ACK/NACK signal according to Binary Phase Shift Keying (BPSK) or modulating a 2-bit ACK/NACK signal according to Quadrature Phase Shift Keying (QPSK).

In the normal CP or the extended CP, one subframe includes a total of 10 OFDM symbols in order to transmit the ACK/NACK signal because one slot includes 5 OFDM symbols in order to transmit the ACK/NACK signal. The modulation symbol d(0) is spread in a cyclic shifted sequence $r(n, I_{cs})$. Assuming that a 1-dimensional spread sequence corresponding to an (i+1)th OFDM symbol in a subframe is m(i), The 1-dimensional spread sequence may be represented by $\{m(0), m(1), \ldots, m(9)\} = \{d(0)r(n, Ics), d(0)r(n, Ics), \ldots, d(0)r(n, Ics)\}$ In order to increase the UE capacity, the 1-dimensional spread sequence may be spread using an orthogonal sequence. The following sequence is used as an orthogonal sequence $w_i(k)$ (i is a sequence index, $0 \leq k \leq K-1$) having a spreading factor K=4.

TABLE 2

| Index (i) | [$w_i(0), w_i(1), w_i(2), w_i(3)$] |
|---|---|
| 0 | [+1, +1, +1, +1] |
| 1 | [+1, −1, +1, −1] |
| 2 | [+1, −1, −1, +1] |

Accordingly, assuming that a given orthogonal sequence index i is given, 2-dimensional spread sequences s(0), s(1), . . . , s(9) may be represented as follows.

{s(0), s(1), . . . , s(9)}={wi(0)m(0), wi(1)m(1), wi(2)m(2), wi(3)m(3), wi(4)m(4), wi(0)m(5), wi(1)m(7), wi(2)m(8), wi(3)m(9)}

The cyclic shift index $I_{cs}$ may vary according to a slot number $n_s$ within the radio frame and/or a symbol index l within a slot. Assuming that a first cyclic shift index is 0 and the value of the cyclic shift index is increased by one per OFDM symbol, the cyclic shift index Ics may be represented as shown in FIG. 7, {s(0), s(1), . . . , s(9)}={wi(0)d(0)r(n,0), wi(1)d(1)r(n,1), . . . , wi(3)d(9)r(n,9)}

The 2-dimensional spread sequences {s(0), s(1), . . . , s(9)} are transmitted through a resource block after IFFT is performed. Accordingly, the ACK/NACK signal is transmitted on the PUCCH.

The orthogonal sequence index i, the cyclic shift index Ics, and the resource block index m are parameters necessary to configure the PUCCH and are ACK/NACK resources (or PUCCH resources) used to distinguish PUCCHs (or UEs) from each other. If the number of available cyclic shifts is 12 and the number of available orthogonal sequence indices is 3, the PUCCHs for a total of 36 UEs may be multiplexed into one resource block.

In 3GPP LTE, ACK/NACK resources defined as the 3 parameters for configuring a PUCCH is identified as a resource index $n^{(1)}_{PUUCH}$.

Figure 8:
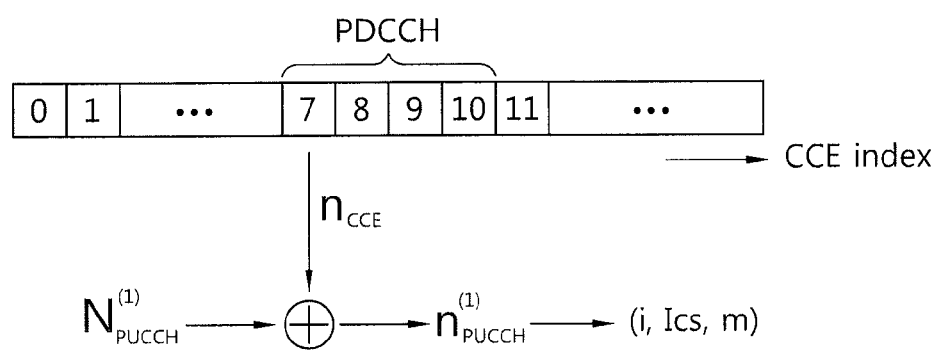
FIG. 8 shows a method of obtaining resources for configuring a PUCCH.

FIG. 8 shows a method of obtaining resources for configuring a PUCCH.

The resource index $n^{(1)}_{PUUCH}$ is defined as $n_{CCE} + N^{(1)}_{PUUCH}$, where $n_{CCE}$ is the index of the first CCE of a PDCCH which is used to transmit a relevant DCI (i.e., downlink resource allocation used to receive a downlink transmission block corresponding to an ACK/NACK signal), and the $N^{(1)}_{PUUCH}$ is a value that a BS informs a UE of a higher layer message.

It is here assumed that a PDCCH where downlink allocation is detected in the control region uses 4 CCEs of CCE indices 7, 8, 9, and 10. The index (or the lowest CCE index) of the PDCCH is the index of a first CCE ($n_{CCE}$=7). The UE may determine the resource index $n^{(1)}_{PUUCH}$ because the $N^{(1)}_{PUUCH}$ is a parameter given by the BS.

The UE may determine the orthogonal sequence index i, the cyclic shift index $I_{cs}$, and the resource block index m for configuring the PUCCH on the basis of the resource index $n^{(1)}_{PUUCH}$.

Consequently, the PUCCH resources used to transmit the PUCCH may be implicitly determined depending on the resources of a relevant PDCCH. This is because the UE does not additionally inform the BS of resources used to transmit the PUCCH for the ACK/NACK signal, but indirectly inform the BS of the resources of the PDCCH used for the resource allocation of a downlink transmission block.

A method of transmitting a recommendation rank and an indicator rank on the basis of the physical channel structure of the 3GPP LTE is described below.

The recommendation rank may be transmitted on a PUSCH. The BS sets a bit, indicating the request of the recommendation rank, in the DCI of a PDCCH. If there is the request of the recommendation rank, the UE may transmit the recommendation rank on the PUSCH by using resource allocation information within the DCI.

The recommendation rank may be transmitted on the PUCCH. PUCCH resources for the PUCCH may be previously engaged. The PUCCH resources for the recommendation rank may be previously defined, or the BS may inform the UE of the PUCCH resources through an RRC message, etc. In this case, there are advantages in that it is not necessary to allocate the PUCCH resources every time and the recommendation rank may be transmitted periodically. Alternatively, if the request of a BS is included in the DCI, the PUCCH resources may be determined from the PDCCH resources through which the recommendation rank request of the BS is transmitted.

The indicator rank may be transmitted on the PDCCH. The CRS of the DCI including the indicator rank may be masked to C-RNTI which is a UE identifier. This means that each UE can receive only its indicator rank.

The indicator rank is defined for each of a plurality of UEs. Accordingly, assuming that the indicator rank for an i-h UE is Ri, a DCI including an indicator rank for k UEs may be configured as follows.

DCI={$R_1, R_2, R_3, \ldots, R_k$}

The CRS of the DCI may be masked to a dedicated identifier for the indicator rank as in Rank Indicator-RNTI (RI-RNTI).

Figure 9:
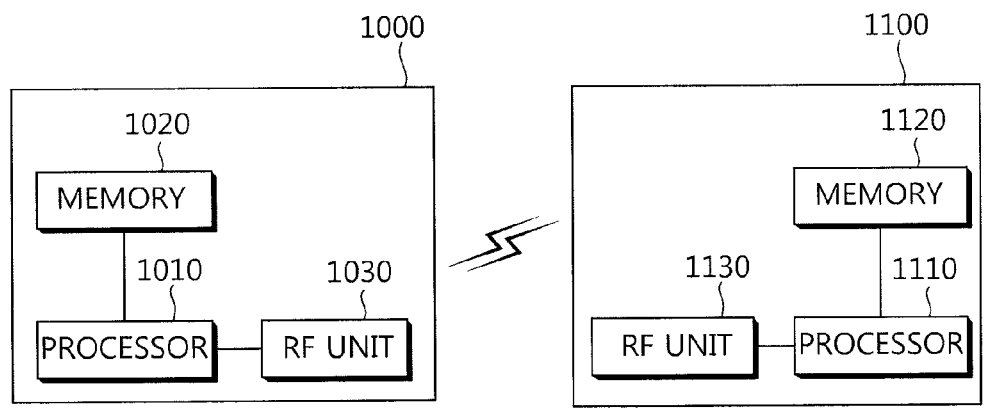
FIG. 9 is a block diagram showing a wireless communication system according to an embodiment of the present invention.

FIG. 9 is a block diagram showing a wireless communication system according to an embodiment of the present invention.

A UE 1000 includes a processor 1010, memory 1020, and a Radio Frequency (RF) unit 103. The processor 1010 feeds a channel state and/or a recommendation rank back and implements the operation of the UE in the embodiments of FIGS. 2 to 4. The memory 1020 is coupled to the processor 1010 and is configured to store protocols or parameters for a MIMO or CoMP operation. The RF unit 1030 is coupled to the processor 1010 and is configured to transmit a radio signal or receive a radio signal or both.

The BS 1100 includes a processor 1110, memory 1120, and an RF unit 1130. The processor 1110 receives a channel state or a recommendation rank or both, determines an indicator rank, and schedules UEs. In the above-described embodiments, the operation of the BS may be implemented by the processor 1110. The memory 1120 is coupled to the processor 1110 and is configured to store protocols or parameters for a MIMO or CoMP operation. The RF unit 1130 is coupled to the processor 1110 and is configured to transmit a radio signal or receive a radio signal or both.

The processor 1010, 1110 may include Application-Specific Integrated Circuits (ASICs), other chipsets, logic circuits, and/or data processors. The memory 1020, 1120 may include Read-Only Memory (ROM), Random Access Memory (RAM), flash memory, memory cards, storage media and/or other storage devices. The RF unit 1030, 1130 may include a baseband circuit for processing a radio signal. When the above-described embodiment is implemented in software, the above-described scheme may be implemented using a module (process or function) which performs the above function. The module may be stored in the memory 1020, 1120 and executed by the processor 1010, 1110. The memory 1020, 1120 may be placed inside or outside the processor 1010, 1110 and connected to the processor 1010, 1110 using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

What is claimed is:

1. A method for feeding back channel information, the method comprising:
    receiving information on a maximum number of ranks;
    if one or more cells are configured, performing a first feedback process and a second feedback process,
    wherein the first feedback process is configured to transmit first channel information generated based on rank information,
    wherein the second feedback process is configured to transmit second channel information,
    wherein the second channel information is generated based on the same rank information as the rank information used for generating the first channel information of the first feedback process, and
    wherein the maximum number of ranks is used to determine the rank information; and
    receiving rank-related information determined by a base station based on the rank information.

2. The method of claim 1, wherein the second channel information transmitted according to the second feedback process includes at least one of a precoding matrix indicator (PMI) and channel quality information (CQI).

3. The method of claim 1, further comprising:
    determining the rank information corresponding the number of antenna layers.

4. The method of claim 1, wherein the first feedback process is related to a first reference signal, and
    wherein the second feedback process is related to a second reference signal.

5. The method of claim 4, wherein each of the first and second reference signals corresponds to at least one of a cell-specific reference signal (CRS) and a channel state information reference signal (CSI-RS).

6. The method of claim 1, wherein each of the first and second channel information is channel state information (CSI).

7. The method of claim 1, further comprising:
    receiving a dedicated reference signal (DRS) which is beamformed based on the first channel information or the second channel information; and
    transmitting updated channel information which is measured using the DRS.

8. The method of claim 1, wherein the first channel information or the second channel information is transmitted on a Physical Uplink Control Channel (PUCCH) or a Physical Uplink Shared Channel (PUSCH).

9. A user equipment (UE), comprising:
    a Radio Frequency (RF) unit configured to transmit and receive a radio signal; and
    a processor coupled to the RF unit and configured to:
        receive information on a maximum number of ranks; and
        perform a first feedback process and a second feedback process if one or more cells are configured,
        wherein the first feedback process is configured to transmit first channel information venerated based on rank information,
        wherein the second feedback process is configured to transmit channel information,
        wherein the second channel information is generated based on the same rank information as the rank information used for generating the first channel information of the first feedback process, and
        wherein the maximum number of ranks is used to determine the rank information; and
        receive rank-related information determined by a base station based on the rank information.

10. The user equipment of claim 9, wherein the second channel information transmitted according to the second feedback process includes at least one of a precoding matrix indicator (PMI) and channel quality information (CQI).

11. The user equipment of claim 9, wherein the processor is further configured to determine the rank information corresponding to the number of antenna layers.

12. The user equipment of claim 9, wherein the first feedback process is related to a first reference signal, and
    wherein the second feedback process is related to a second reference signal.

13. The user equipment of claim 12, Wherein each of the first and second reference signals corresponds to at least one of a cell-specific reference signal (CRS) and a channel state information reference signal (CSI-RS).

14. The user equipment of claim 9, wherein each of the first and second channel information is channel state information (CSI).

15. The method of claim 1, wherein the rank-related information is received through a downlink control information (DCI) scrambled with a radio network temporary identity (RNTI).

16. The method of claim 15, wherein the RNTI is a rank indicator-RNTI.

* * * * *